(12) United States Patent
Danichev et al.

(10) Patent No.: US 10,419,269 B2
(45) Date of Patent: Sep. 17, 2019

(54) ANOMALY DETECTION

(71) Applicant: Hewlett Packard Enterprise Development LP, Houston, TX (US)

(72) Inventors: Pavel Danichev, Yehud (IL); Ron Maurer, Haifa (IL); Nurit Peres, Yehud (IL); Fernando Vizer, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 208 days.

(21) Appl. No.: 15/438,477

(22) Filed: Feb. 21, 2017

(65) Prior Publication Data
US 2018/0241654 A1    Aug. 23, 2018

(51) Int. Cl.
*G06F 15/173* (2006.01)
*H04L 12/24* (2006.01)
(Continued)

(52) U.S. Cl.
CPC ...... *H04L 41/064* (2013.01); *H04L 29/06891* (2013.01); *H04L 41/069* (2013.01);
(Continued)

(58) Field of Classification Search
CPC .............. H04L 29/06877–29/06897; H04L 41/0631–41/0645; H04L 41/0677; H04L 41/069; H04L 41/0695; H04L 43/00–43/0817; H04L 63/1408–63/1425; G06F 11/34–11/3495
See application file for complete search history.

(56) References Cited

U.S. PATENT DOCUMENTS 7,055,062 B2    5/2006 Shah et al.
7,310,590 B1   12/2007 Bansal
(Continued)

FOREIGN PATENT DOCUMENTS

CN    102141997    8/2011
CN    102163198    8/2011
(Continued)

OTHER PUBLICATIONS

Wang, W. et al., "Processing of Massive Audit Data Streams for Real-time Anomaly Intrusion Detection," (Research Paper), Oct. 13, 2007, Computer Communications 31.1, pp. 58-72, available at https://mine.kaust.edu.sa/Documents/papers/comcom_2008.pdf.
(Continued)

*Primary Examiner* — Brendan Y Higa

(57) ABSTRACT

Event-time pairs are received for a current time slot. Each event-time pair denotes the occurrence of an event at a system by an event type as well as an occurrence time. For each different event type, a property value for the time slot is computed for each different property of a number of different properties, from the event-time pairs having the different event type. For each different property, a time-decaying histogram of identified property values of the different property is updated using the property value computed for the different property for the current time slot. An anomaly score for each identified property value within the time-decaying histogram of each different property is computed to detect occurrence of an anomaly within the system.

20 Claims, 4 Drawing Sheets

(51) Int. Cl.
*H04L 12/26* (2006.01)
*H04L 29/06* (2006.01)

(52) U.S. Cl.
CPC ............ *H04L 43/024* (2013.01); *H04L 43/04* (2013.01); *H04L 43/067* (2013.01); *H04L 63/145* (2013.01)

(56) References Cited

U.S. PATENT DOCUMENTS

| | | | |
|---|---|---|---|
| 7,519,860 | B2 | 4/2009 | Hätönen et al. |
| 7,689,455 | B2 | 3/2010 | Fligler et al. |
| 7,716,169 | B2 | 5/2010 | Park et al. |
| 8,341,159 | B2 | 12/2012 | Gates |
| 8,370,362 | B2 | 2/2013 | Szabo |
| 8,566,943 | B2 | 10/2013 | Martynenko et al. |
| 8,630,443 | B2 | 1/2014 | Tan et al. |
| 8,667,385 | B1 | 3/2014 | Mui et al. |
| 8,776,234 | B2 | 7/2014 | Doukhvalov |
| 8,813,236 | B1* | 8/2014 | Saha ............... H04L 63/1408 726/22 |
| 8,887,286 | B2 | 11/2014 | Dupont et al. |
| 8,966,392 | B2 | 2/2015 | Antony et al. |
| 8,996,350 | B1 | 3/2015 | Dub |
| 9,003,023 | B2 | 4/2015 | Crank et al. |
| 9,069,957 | B2 | 6/2015 | Tuvell et al. |
| 9,276,948 | B2* | 3/2016 | Hitt ............... H04L 63/1425 |
| 9,298,525 | B2* | 3/2016 | Zhu ............... G06F 11/0709 |
| 10,129,274 | B2* | 11/2018 | Sheth ............... H04L 43/00 |
| 2007/0038625 | A1 | 2/2007 | Yang-Stephens et al. |
| 2007/0043723 | A1 | 2/2007 | Bitan et al. |
| 2007/0203885 | A1 | 8/2007 | Kim et al. |
| 2009/0150436 | A1 | 6/2009 | Godbole et al. |
| 2010/0077481 | A1 | 3/2010 | Polyakov et al. |
| 2010/0125540 | A1 | 5/2010 | Stefik et al. |
| 2012/0102053 | A1 | 4/2012 | Barrett et al. |
| 2012/0137367 | A1 | 5/2012 | Dupont et al. |
| 2012/0167218 | A1 | 6/2012 | Poomachandran et al. |
| 2012/0222089 | A1* | 8/2012 | Whelan ............... H04B 7/18593 726/3 |
| 2013/0030875 | A1 | 1/2013 | Lee et al. |
| 2013/0055145 | A1 | 2/2013 | Antony et al. |
| 2013/0097104 | A1 | 4/2013 | Lu et al. |
| 2013/0144813 | A1 | 6/2013 | Sengupta et al. |
| 2013/0159348 | A1 | 6/2013 | Mills |
| 2013/0268889 | A1 | 10/2013 | Barak et al. |
| 2013/0298230 | A1 | 11/2013 | Kumar et al. |
| 2014/0006338 | A1 | 1/2014 | Watson et al. |
| 2014/0095548 | A1 | 4/2014 | Chen et al. |
| 2014/0096249 | A1 | 4/2014 | Dupont et al. |
| 2014/0129753 | A1 | 5/2014 | Schuette et al. |
| 2014/0258197 | A1 | 9/2014 | Davulcu et al. |
| 2014/0258791 | A1 | 9/2014 | Kew |
| 2014/0280142 | A1 | 9/2014 | Wasson et al. |
| 2014/0343997 | A1 | 11/2014 | Brown et al. |
| 2014/0365527 | A1 | 12/2014 | Fuchs et al. |
| 2015/0088808 | A1 | 3/2015 | Tyagi et al. |
| 2015/0095471 | A1 | 4/2015 | Singh et al. |
| 2016/0085848 | A1 | 3/2016 | Kogan |
| 2017/0192872 | A1 | 7/2017 | Awad |

FOREIGN PATENT DOCUMENTS

| | | |
|---|---|---|
| CN | 102194013 | 9/2011 |
| CN | 103220343 A | 7/2013 |
| EP | 1622044 | 2/2006 |
| IN | 04043CH2014 | 9/2014 |
| KR | 10-2002-0089677 | 11/2002 |
| KR | 10-2003-0094966 | 12/2003 |
| WO | WO-2013090910 | 6/2013 |

OTHER PUBLICATIONS

Kurtic, B., "New Techniques Detect Anomalies in Big Data", Founding Vice President of Product and Strategy, Sumo Logic, Jan. 21, 2014, online <http://tdwi.org/Articles/2014/01/21/Detecting-Big-Data-Anomalies.aspx?Page=1>.
Samak, Taghrid et al., "Online Fault and Anomaly Detection for Large-scale Scientific Workflows", 2011, online <http://dl.acm.org/citation.cfm?id=2058100>.
Zhu, Xudong et al., "Activity Clustering for Anomaly Detection", Sep. 2013, online <http://dl.acm.org/citation.cfm?id=2528344>.
Harutyunyan, A.N. et al., "Abnormality Analysis of Streamed Log Data," (Research Paper), 2014, IEEE Network Operations and Management Symposium (NOMS), 7 pages, available at https://www.researchgate.net/profile/Ashot_Harutyunyan2/publication/258283297_Abnormality_Analysis_of_Streamed_Log_Data/links/0c96052d912a202e1b000000.pdf.
Kim, H. et al., "Behavior-based Anomaly Detection on Big Data," (Research Paper), Australian Information Security Management Conference, 2015, 9 pages, available at http://ro.ecu.edu.au/cgi/viewcontent.cgi?article=1182&context=ism.
"Challenges and Opportunities with Big Data"; Feb. 22, 2012; http://www.purdue.edu/discoverypark/cyber/assets/pdfs/BigDataWhitePaper.pdf.
"Detecting Malware with Your Proxy Logs"; Mar. 23, 2013; Windows Logging Service (WLS), DFIR, etc. 3 pages.
Dubey, A. et al.; "A Cluster-level Semi-supervision Model for Interactive Clustering"; Jul. 1, 2010; 16 pages.
Endert, A. et al.; "Toward Usable Interactive Analytics: Coupling Cognition and Computation"; Jul. 18, 2014; 5 pages.
Filed Patent Application. Filed Jun. 27, 2012, U.S. Appl. No. 13/534,342.
Landesberger, T.V. et al.; "Interaction Taxonomy for Tracking of User Actions in Visual Analytics Applications"; Jun. 30, 2012; 18 pages.
Lee, H., Unsupervised Feature Learning via Sparse Hierarchical Representations, (Research Paper), Aug. 2010.
Madni, A.M. et al.; "Exploring and assessing complex systems' behavior through model-driven storytelling"; Oct. 5-8, 2014; 6 pages.
Maguitman, A. et al., Dynamic Extraction of Topic Descriptors and Discriminators: Towards Automatic ContextÂ?based Topic Search, (Research Paper), Nov. 8-13, 2004.
PCT International Search Report cited in PCT/US2015/045471; dated May 17, 2016; 3 pages.
Shebuti Rayana et al., "An Ensemble Approach for Event Detection and Characterization in Dynamic Graphs," 2014 ACM SIGKDD—International Conference on Knowledge Discovery and Data Mining, 10 pages, Aug. 24, 2014.
Xu, X., A New Sub-topic Clustering Method Based on Semi-supervised Learning, (Research Paper), Oct. 2012, pp. 2471-2478, vol. 7, No. 10.
Thienne Johnson et al., "Network Anomaly Detection Using Autonomous System Flow Aggregates," GLOBECOM 2014—Communication and Information System Security Symposium, 22 pages, , Dec. 8-12, 2014.
A. Aizawa, "An information-theoretic perspective of tf-idf measures," Information Processing and Management 39 (2003), pp. 45-65.
A. Amir, E. Eisenberg, A. Levy, E. Porat, N. Shapira: "Cycle Detection and Correction." ICALP (1) 2010: 43-54.
G. Forman, "BNS feature scaling: an improved representation over tf-idf for svm text classification," CIKM 2008: 263-270.
G. Landau and U. Vishkin. Introducing efficient parallelism into approximate string matching and new serial algorithm. In 18th ACM STOC, pp. 220-230, 1986.
M. Aharon, G. Barash, I. Cohen, and E. Mordechai, "One Graph Is Worth a Thousand Logs: Uncovering Hidden Structures in Massive System Event Logs", ECML/PKDD (1) 2009, pp. 227-243.
M. R. Garey and D. S. Johnson: "Computers and Intractability: A Guide to the Theory of NP-Completeness". W. H. Freeman, 1979.
PCT; "Notification of Transmittal of the International Search Report and the Written Opinion of the International Searching Authority, or the Declaration"; cited Appl. No. PCT/US2014/069745; dated Aug. 17, 2015; 12 pages.

(56) References Cited

OTHER PUBLICATIONS

T. Mori, M. Kikuchi, K. Yoshida, "Term Weighting Method based on Information Gain Ratio for Summarizing Documents retrieved by IR systems," Journal of Natural Language Processing, 2008, 9(4):3-32.

W. Xu, L. Huang. A. Fox, D. Patterson, M. I. Jordan, "Detecting Large-Scale System Problems by Mining Console Logs", ACM Symposium on Operating Systems Principles, 2009, 16 pages.

WikipediA, "Generalized Suffix Tree", retrieved from the Internet on Dec. 7, 2018, 2 pages.; <http://en.wikipedia.org/wiki/Generalized_suffix_tree>.

Wikipedia, "Levenshtein Distance", retrieved from the Internet on Dec. 7, 2018, 8 pages.; <http://en.wikipedia.org/wiki/Levenshtein_distance>.

WikiPedia, "Radix tree", retrieved from the Internet on Dec. 7, 2018, 8 pages.; <http://en.wikipedia.org/wiki/Compact_prefix_tree>.

* cited by examiner

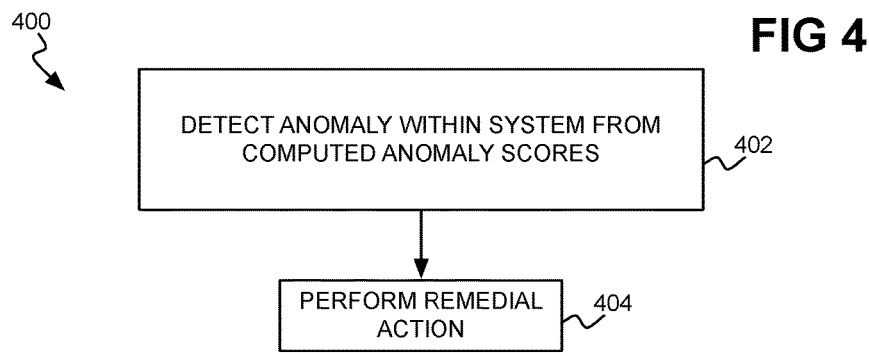
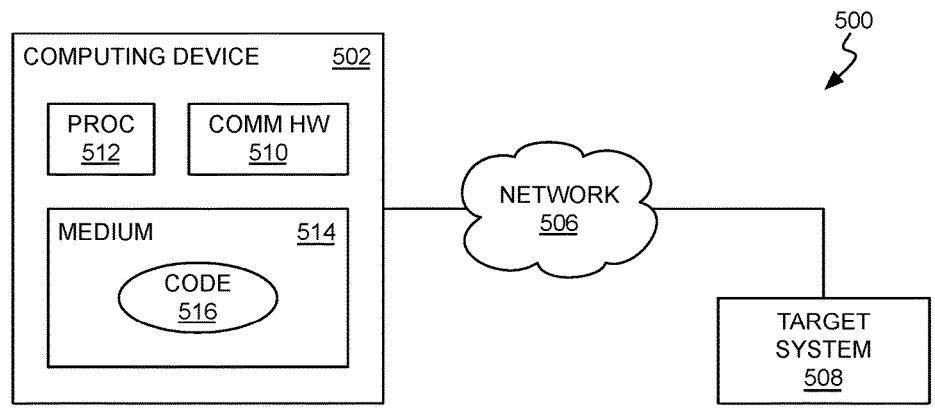

ANOMALY DETECTION

BACKGROUND

Modern electronic environments can include distributed environments, such as computing environments having a large number of systems, like server computing devices, or servers. Information regarding each server computing device may be continuously logged over successive log messages, and can be streamed to processing devices, which may themselves be servers, and which collect and analyze the data. A given processing device may be responsible for collecting data from hundreds, thousands, or even more of servers or other devices that are generating data.

BRIEF DESCRIPTION OF THE DRAWINGS

FIG. 4 is a flowchart of an example method for using a computed anomaly score to detect an anomaly as a trigger on which basis to perform a remedial action.

FIG. 5 is a diagram of an example computing environment.

DETAILED DESCRIPTION

As noted in the background section, within a distributed environment a processing device may be responsible for receiving and analyzing log messages streamed from a large number of systems like server computing devices, or servers. Anomalies within the servers may be discernible from the events that the log messages generated by the servers represent, so that appropriate remediation actions can be taken during a failure or a state of improper operation. The large number of such log messages, and the frequency at which they are received, effectively prohibit manual discovery of such anomalies, and manual inspection of the messages typically is reserved for after-the-fact analysis as opposed to real-time or near real-time anomaly detection and remediation action performance.

Techniques described herein permit streams of events from even very large numbers of servers or other systems that are generated at high frequencies to be processed in real time or in near real time to quickly detect anomalies within the system that would otherwise be essentially incapable of being detected. As such, appropriate remediation actions to resolve the anomalies can be performed to lessen system downtime as well as non-optimal system performance. The techniques described herein provide a technical solution to a real, concrete technological issue, in environments in which the number of events generated by servers can exponentially increase, and as the number of servers within a distributed environment increases. The detection and corresponding resolution of issues or other anomalies within such an environment cannot be achieved by simply "scaling up" existing anomaly detection methodologies or by just automating manual detection approaches, to the extent that such manual detection approaches even exist.

Figure 1:
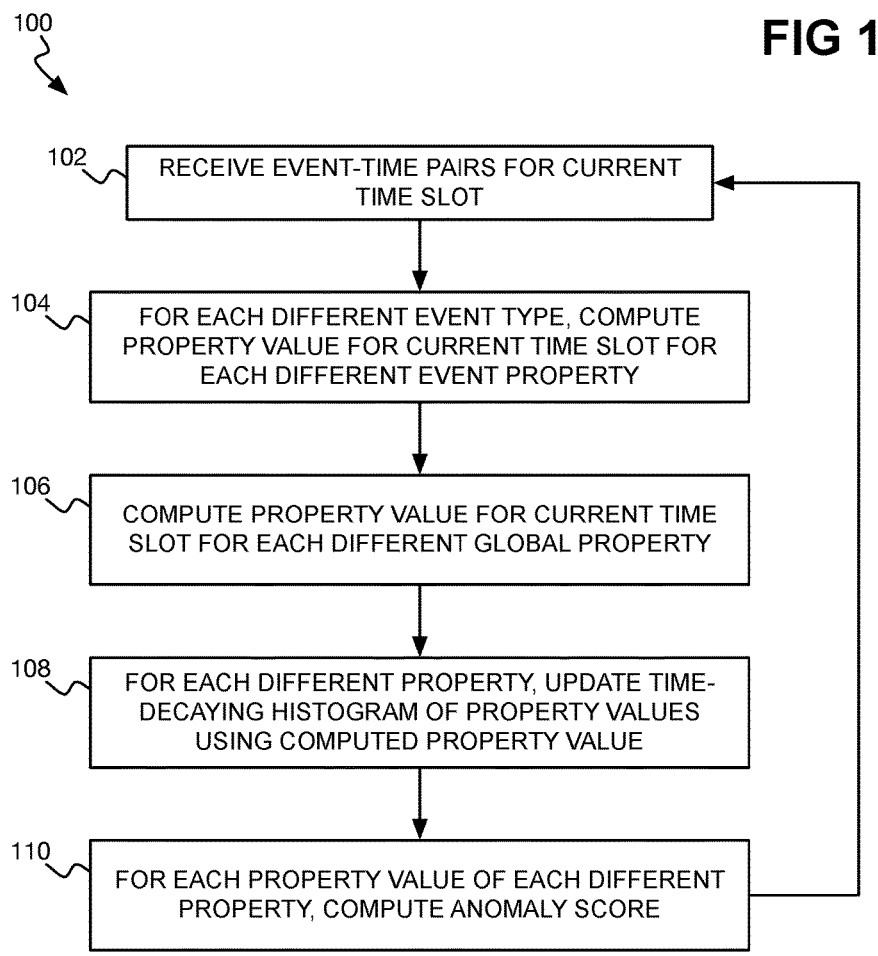
FIG. 1 is a flowchart of an example method for computing an anomaly score from events generated at and received from a system.

FIG. 1 shows an example method 100 for computing anomaly scores on which basis anomalies can be detected within an environment that can have a large number of systems, such as servers, at which large numbers of events occur at high frequency. The method 100 can be implemented as computer-executable code stored on a non-transitory computer-readable data storage medium of a processing device, which may be a particular server assigned to retrieve or otherwise receive log messages from the systems on a real-time or near real-time basis, such as within an event stream. A processor of the processing device executes this code, and the processing device is communicatively connected to the systems, such as over a network. The processing device performs the method 100 for each system that the processing device is to detect the occurrence of anomalies, but is described in relation to one system. The method 100 is described in relation to a current time slot, and is repeated for each time slot.

The processing device receives event-time pairs for the current time slot (102). Each event-time pair denotes the occurrence of an event at the system in relation to which the method 100 is being performed, at an occurrence time. The event of each event-time pair has an event type. Within a current time slot, therefore, there are multiple event-time pairs. More than one event-time pair within the current time slot may correspond to the same event type, indicating that an event of this event type has occurred at different occurrence times within the time slot.

Figure 2:
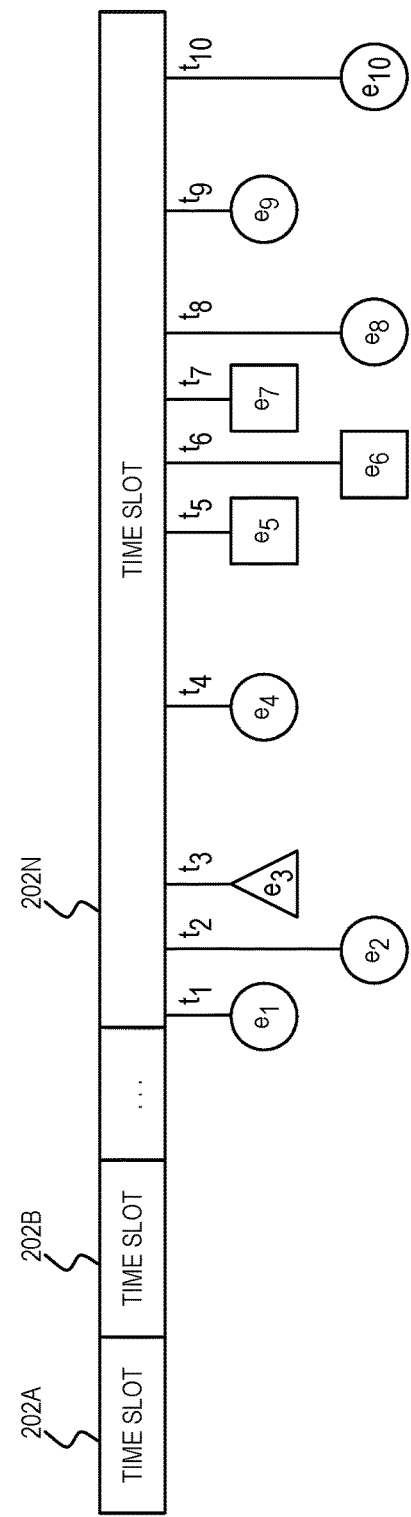
FIG. 2 is an illustrative diagram of example events of varying event types occurring within a current time slot.

FIG. 2 illustratively depicts an example of events occurring within a time slot. There are consecutive time slots 202A, 202B, . . . , 202N, collectively referred to as the time slots 202. The time slot 202N is depicted in detail, and is the current time slot insofar as it is the latest time slot. Ten events $e_n$, n=1:10, are depicted as occurring in the time slot 202N, at corresponding times $t_n$. Event types are indicated by different shapes. Therefore, in the example of FIG. 2, there are three different event types, represented of circles, triangles, and squares.

Towards the beginning of the time slot 202N, events $e_1$, $e_2$, $e_3$ occur at relatively equally spaced times $t_1$, $t_2$, $t_3$, respectively. Events $e_1$ and $e_2$ are of a first event type, and event $e_3$ is of a second event type. Some time thereafter, another event $e_4$ of the first event type occurs at time $t_4$. After another length of time, four events $e_5$, $e_6$, $e_7$, $e_8$ occur in quick succession at relatively equally spaced times $t_5$, $t_6$, $t_7$, $t_8$, respectively. Events $e_5$, $e_6$, $e_7$ are of a third event type, and event $e_8$ is of the first event type. After another lapse of time, another event $e_9$ of the first event type occurs at time $t_9$, and finally a last event $e_{10}$ of the same event type within the time slot 202N occurs at time $t_{10}$.

Therefore, in the example of FIG. 2, while there are ten individual events that have occurred within the time slot 202N, the events are of just three different event types. Of the first event type denoted by circles in FIG. 2, there are six events $e_1$, $e_2$, $e_4$, $e_8$, $e_9$, $e_{10}$. Of the second event type denoted by triangles, there is one event $e_3$. Of the third event type denoted by squares, there are three events $e_5$, $e_6$, $e_7$.

As an example of how event-time pairs may occur, a server may stream log messages $M_n$ that each have a time stamp $t_n$. The messages may be clustered over clusters corresponding to different message, or event, types, $e[M_n]$, or $e_n$. Thus, the stream of log messages can be represented by event-time pairs ($e_n$, $t_n$). This means that each message n represents an event $e_n$ occurring at time $t_n$. The value of $e_n$ corresponds to the event type of the event that has occurred, where multiple events within the current time slot can have the same value. The value of $t_n$ indicates the time at which this event occurred.

The event-time pairs therefore are a parsed perspective of the log messages that are streamed by a server or other system. Event types can correspond to the same underlying physical parameter but in varying degrees. For example, the operating temperature of a server may be considered normal, elevated, or excessive. The log messages may specify the operating temperature numerically, where a clustering or other parsing technique is used to indicate whether the specified temperature value is normal, elevated, or excessive. As another example, the processing capacity utilization rate of the processors of the server may be considered as under utilized, normally utilized, or over utilized. The log messages may specify the utilization rate numerically (i.e., as a percentage), where a cluster or other parsing technique is used to indicate whether the specified rate represents under utilization, normal utilization, or over utilization. As such, log messages that are information rich are in actuality received in part 102 of the method 100 as a parsed or translated sequence of events, of different types.

The time slots are of a same prespecified length of time, $\Delta T$. The time slots may have a size of five minutes, for instance, or which is otherwise specified in accordance with the length of time that is to transpire to collect events on which basis anomalies in the underlying server or other system are to be detected. The time slots are measured beginning at a starting time $t_{start}$, such that for i time slots, each time slot is identified as $T_i = t_{start} + i \cdot \Delta T$. The events within a time slot can be counted by event type, such that for event type e, the number of events having this event type within time slot T is denoted as $N_e[T]$. The total number of events, of any event type, within time slot T is denoted as $N[T] = \Sigma_e N_e[T]$.

Furthermore, the $k^{th}$ event of event type e in time slot T and its corresponding occurrence time is denoted as $n_k(e, T), t_k(e, T)$ for $k=1:N_e[T]$. The last event of event type e before time slot T and its correspondence occurrence time is denoted as $n_0(e, T), t_0(e, T)$. The time difference between the $k^{th}$ event of type e in time slot T and the preceding event of the same type within this time slot is denoted as $\Delta t_k(e, T) = t_k(e, T) - t_{k-1}(e, T)$. The time that has passed from the last occurrence of an event of event type e before time slot T and the first occurrence of an event of the same event type in time slot T can thus be denoted as $\Delta t_0(e, T) = t_1(e, T) - t(e, T)$.

Similarly, the $j^{th}$ event of any event type in time slot T and its corresponding occurrence time is denoted as $e_j(T), t_j(T)$ for $j=1:N[T]$. The time difference between the $j^{th}$ event in time slot T and the preceding event—regardless of the event type of either event—can thus be denoted as $\Delta t_j(T) = t_j(T) - t_{j-1}(T)$. Therefore, as used herein, k is employed in relation to events of a particular event type e in a time slot T, whereas j is employed in relation to events regardless of event time (i.e., of any event type) in a time slot T.

The occurrence times at which events occur at a system like a server are provided in accordance with a specified precision. This precision, or resolution, may be specified as a second, a millisecond, and so on, depending on how the system itself timestamps log messages that it generates. This resolution is denoted as $\delta t$.

Furthermore, the event counts within time slot T for events e, can be plotted as a histogram h(T), where $h(T) = \{N_e[T]\}$. While there are a total number of events N[T] occurring within a time slot T, there can be more than one event of the same event type. The number of distinct event types of which at least one event has occurred within time slot T is denoted as $V[T] = |h(T)| = \Sigma_e I(N_e[T] > 0)$. In this equation, I is evaluated as one for a particular event type e if there are any events of this event type within time slot T (i.e., $N_e[T] > 0$), and is evaluated as zero for event type e if there are no events of this type within time slot T (i.e., $N_e[T] = 0$).

Referring back to FIG. 1, for each different event type, a property value for the current time slot is computed for each different event property (104). An event property can be considered a characteristic of the events of the same event type. An event property has a value for each time slot, and provides the measure of the characteristic in question with respect to the events of the same type that occurred in this time slot. If no events of a particular event type occurred within a time slot, then the property value for the corresponding event property can be zero.

Furthermore, the same event properties can have property values computed for a time slot for each different event type. For example, there may be two different event properties PA and PB, and three different event types ea, eb, and ec. For each time slot, each event property has a value for each different event type. As such, for each time slot, there is a value for the property PA for the event type ea, a value for the property PA for the event type eb, and a value for the property PA for the event type ec. Similarly, for each time slot, there is a value for the property PB for the event type ea, a value for the property PB for the event type eb, and a value for the property PB for the event type ec. The property value of an event property is thus specific to both a time slot and an event type.

Three different example event properties are described: an activity event property, a surprise event property, and a burst event property. In general, an event property can be denoted as X. The activity event property reflects, for a time slot and an event type, the activity of the events of this event type within the time slot. The property value for the activity event property with respect to the events of event type e occurring within time slot T can be specified as $X_A(e, T) = \log_2(1 + N_e[T])$.

An anomaly of the activity event property of a particular event type within the current time slot is said to correspond to an exceptionally high property value as compared to the value in prior time slots. Stated another way, an anomaly of the activity event property within the current time slot can correspond to a frequency of occurrences of the event of the event type in question greater than a dynamic threshold corresponding to previous time slots. The threshold is dynamic in that the comparison can be specified in terms of multiples or orders of magnitude. That is, the activity event property for an event type can have an anomalous property value in the current time slot if this value is many threshold times more than the its property values in the prior time slots, as opposed to the difference between the property value in the current time slot and the property value in a prior time slot being greater than a threshold. The dynamic threshold in this respect is due to the property values being based on a logarithmic base two computation.

The surprise event property reflects, for a time slot and an event type, the appearance of an event of this event type within the time slot. The property value for the surprise event property with respect to the events of event type e occurring within time slot T can be specified as $$X_S(e, T) = \log_2\left(1 + \frac{\Delta t_0(e, T)}{\delta t}\right).$$

An anomaly of the surprise event property of a particular event type within the current time slot is also said to correspond to an exceptionally high property value as compared to the value in prior time slots. Stated another way, an anomaly of the surprise event property within the current time slot can correspond to the occurrence of an event of the event type in question after a length of time in which the event has not occurred greater than a dynamic threshold.

The threshold is dynamic in that the comparison can be specified in terms of multiples or orders of magnitude. That is, the surprise event property for an event type can have an anomalous property value in the current time slot if an event of this event type has occurred after a passage of time many threshold times since its last occurrence, as opposed to this passage of time being greater than a threshold length of time. The dynamic threshold in this respect is due to the property values being based on a logarithmic base two computation. The surprise event property thus can provide for anomaly detection for event types of which events occur frequently as well as for those of which events occur infrequently.

The burst event property reflects, for a time slot and an event type, the repeating appearance of events of this event type in a short period of time within the time slot. The property value for the burst event property with respect to the events of event type e occurring within time slot T can be specified as $$X_B(e, T) = \left( X_S(e, T) - HM\left( \log_2\left( 1 + \frac{\Delta t_{1:N_e-1}}{\delta t} \right) \right) \right)_{0+} \cdot$$

In this $(\log_2 N_e[T])^{0.25}$ equation, HM specifies the harmonic mean of a set of values. For instance, the harmonic mean of a set of values $X_k$ is $$\frac{1}{\text{mean}(1/x_K)}.$$

An anomaly of the burst event property of a particular event type within the current time slot is also said to correspond to an exceptionally high property value as compared to the value in prior time slots. Stated another way, an anomaly of the burst event property within the current time slot can correspond to multiple occurrences of events of the event type in question within the current time slot at time intervals less than a dynamic threshold.

The threshold is dynamic in that the comparison can be specified in terms of multiples or orders of magnitude. That is, the burst event property for an event type e can have an anomalous property value in the current time slot T if events of this event type have occurred multiple times at time intervals that are much shorter than $\Delta t_0(e,T)$. The dynamic threshold in this respect is again due to the property values being based on a logarithmic base two computation.

As noted, an event property has a property value in each time slot for each different event property. In one implementation, a property value for each different global property can also be computed for the current time slot (106). Unlike an event property, a global property can be considered a characteristic of the events across event types. A global property has a value for each time slot, and provides the measure of the characteristic in question with respect to the events that have occurred in this time slot, in consideration of events having different event types.

For example, there may be two global properties GA and GB, and three different event types ea, eb, and ec. For each time slot, each global property has a value. That is, for each time slot, there is a value for the property GA and a value for the property GB. The values are not per-event type, in other words. There is no value for the property GA just for the event type ea, no value for the property GA just for the event type eb, and no value for the property GA just for the event type ec, for instance. Likewise, there is no value for the property GB just for the event type ea, no value for the property GB just for the event type eb, and no value for the property GB just for the event type ec.

Five different example global properties are described: a global activity property, a global surprise property, a global variety property, a global frequent event property, and a global event dynamics property. In general, a global property can be defined as G. The global activity property reflects, for a time slot, the activity of the events within the time slot, regardless of their event types. The global activity property is thus similar to the activity event property, but does not distinguish among events of different types. The property value for the global activity property with respect to the events occurring within time slot T can be specified as $G_A(T)=\log_2(1+N[T])$.

An anomaly of the global activity property within the current time slot is said to correspond to an exceptionally high property value as compared to the value in prior time slots. An anomaly of the global activity property within the current time slot can correspond to event activity within the current time slot greater than a dynamic threshold. The threshold is dynamic as has been described above, in that the comparison can be specified in terms of multiples or orders of magnitude, owing to the logarithmic base two computation.

The global surprise property reflects, for a time slot, the appearance of events of many different event types within the time slot. The property value for the global surprise property with respect to the events occurring within time slot T can be specified as $$G_S(T) = \log_2\left( 1 + \frac{\Sigma_e \Delta t_0(e, T)}{\delta t} \right).$$

An anomaly of the global surprise property within the current time slot also corresponds to an exceptionally high property value as compared to the value in prior time slots. An anomaly of the global surprise property within the current time slot can correspond to occurrences of events of multiple different event types within the current time slot after a length of time in which events of these types have not occurred that is greater than a dynamic threshold. The threshold is dynamic in this respect because, as noted above, the comparison can be specified in terms of multiples or orders of magnitude, due to the computation being a logarithmic base two computation. An example anomaly thus can occur when there are events of many different event types that appear for the first time, or a long time after that last occurred.

The global variety property reflects, for a time slot, the number of different event types of which events have occurred within the time slot. The property value for the global variety property with respect to the events occurring within time slot T can be specified as $G_V(T)=\log_2|h(T)|$. An anomaly of the global variety property within the current time slot corresponds to an exceptionally high property value as compared to the value in prior time slots. The anomaly of the global variety property can correspond to the number of different event types of which events have occurred within the current time slot being greater than a threshold that is dynamic due to its comparison being specified in multiples or orders of magnitude rather because since the underlying computation is a logarithmic base two computation. An example anomaly thus can occur when there are events of more event types within the current time slot than typical, for instance.

The global frequent event property reflects, for a time slot, the number of event types of which events have occurred within the time slot at high frequency as compared to events of other event types that have occurred within the time slot. The property value for the global frequent event property with respect to the events occurring within time slot T can be specified as $$G_F(T) = \log_2\left[\frac{(\Sigma_e N_e[T])^2}{\Sigma_e (N_e[T])^2}\right].$$

An anomaly of the global variety property within the current time slot corresponds to an exceptionally high property value as compared to the value in prior time slots. The anomaly can correspond to the number of the different event types of which there are occurrences of events in the current time slot greater than a first dynamic threshold, where the occurrences are in number greater than a second dynamic threshold. The thresholds are dynamic because the comparison in detecting an anomaly is effectively specified in multiples or orders of magnitude because of the logarithmic base two nature of the underlying computation. An example anomaly can occur when there are highly repetitive events of a greater number of event types than in prior time slots.

The global event dynamics property reflects, for a time slot, the time difference of consecutive events of different event types within the time slot. As such, the global event dynamics property in effect excludes bursts of events of the same event type from consideration. The global event dynamics property can be computed by considering the time differences between which consecutive events are different, or $\{\Delta_{j'}\}_c = \Delta t_j(T|e_j \neq e_{j-1})$. The number of event changes in time slot T is thus $N_c[T] = |\{\Delta t_{j'}\}_c|$. The global event dynamics property can be specified as $$G_D(T) = \log_2\left(\Sigma_{j' \leq N_C[T]} \log_2\left[\frac{\Delta T}{\max(\delta t, \Delta t_{j'})}\right]\right)_{0+}.$$

As with the other properties, an anomaly of the global event dynamics property within the current time slot corresponds to an exceptionally high property value as compared to the value in prior time slots. An anomaly of the global event dynamics property within the current time slot can correspond to successive occurrences of events of different event types within the current time slot at time intervals less than a dynamic threshold. The threshold is again dynamic due to the property values being based on a logarithmic base two computation. An anomaly of the global event dynamics property can occur in a time slot in which there are many more transitions between events of different types that are short in time in the time slot as compared to prior time slots.

The result of parts 104 and 106 of the method 100 is the computation of a property value for the current time slot for each different property, be it an event property (per part 104) or a global property (per part 106).

For each property (including each event property and each global property), a histogram of the property values of the property that have been computed over the time slots is maintained. The histogram for a property thus maintains the number of times, or the counts, that the property values have been computed over the time slots. These property values can be referred to as identified property values, in that they are property values that have been identified, computed, or "seen" over successive time slots.

For example, a property P may have had four different property values pa, pb, pc, and pd computed over a number of time slots. The property value pa may have been computed in ca time slots; the property value pb may have been computed in cb time slots; the property value pc may have been computed in cc time slots; and the property value pd may have been computed in cd time slots. Therefore, the histogram for the property P maintains the counts ca, cb, cc, and cd for the property values pa, pb, pc, and pd, respectively.

Figure 3:
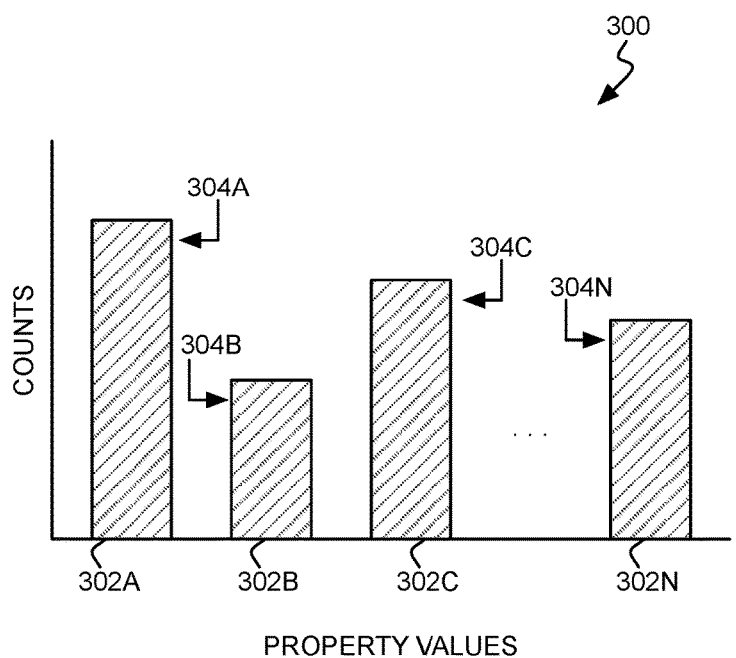
FIG. 3 is a diagram of an example histogram of property values for a property.

FIG. 3 shows an example histogram 300 for a property. The property may be an event property or a global property. Over the time slots, different property values 302A, 302B, 302C, ..., 302N, which are collectively referred to as the property values 302, have been computed for the property. This histogram 300 maintains counts 304A, 304B, 304C, ..., 304N, which are collectively referred to as the counts 304, for the respective property values 302. This means that the property value 302A has been computed in a number of time slots equal to the count 304A; the property value 302B has been computed in a number of time slots equal to the count 304B; the property value 302C has been computed in a number of time slots equal to the count 304C; and the property value 302D has been computed in a number of time slots equal to the count 304D.

Referring back to FIG. 1, for each different property (including each event property and each global property), a histogram of the property values of the property in question is updated using the property value computed in part 104 or part 106 for this property in the current time slot (108). Most generally, the count for the property value of a property that has been computed for the property in the current time slot is incremented by one. For instance, as to the example histogram 300 of FIG. 3, if the property value computed in part 104 or part 106 is the property value 302B, then the count 304B is incremented by one.

However, the histogram of the property values of each property can be a time-decaying histogram. This means that existing counts of the property values of a property are time-decayed before the count corresponding to the property value computed for the property in the current time slot is incremented. Since anomalies are detected based on the property values, as noted above in relation to the example event and global properties, maintaining a time-decaying histogram ensures that more recent property values are weighted more than older property values. Over time, the property value computed in a given time slot will thus contribute less to the corresponding overcall count for the property value within the histogram.

The histogram for a property at time slot T can be denoted as H(T), which reflects the counts of computed property values for this property at the time slots prior to and including time slot T. The histogram for the property at time slot T−1 is thus denoted as H(T−1). Therefore, at the current time slot T, the histogram of property values of a property can be updated using the property value computed for the property in this current time slot as $H(T) = w_{td} H(T-1) + y(T)$. In this equation, y(T) is a sparse vector having a value of one at a position of the histogram corresponding to the property value computed for the property in the current time slot T, and values of zero at the other positions of the histogram. For instance, as to the example histogram 300 of FIG. 3, if the property value computed for the property in the current time slot T is the property value 302B, then y(t)={0,1, 0 , . . . , 0}. The value of one is at the position of the histogram corresponding to the property value 302B, so that the corresponding count 304B is incremented by one, and not any other counts 304 corresponding to the other property values 302.

The histogram H(T−1) at the prior time slot T−1 is multiplied by a time-decay weight $w_{td}$ prior to the addition of the sparse vector y(T) so that the resulting histogram H(T) is indeed a time-decaying histogram. Stated another way, prior to incrementing the count of the histogram corresponding to the computed property value for a property, the existing counts of the histogram is time-decayed. The time-decay weight $w_{td}$ can be $$1 - \frac{\Delta T}{\tau},$$

where ΔT is the length of time of each time slot (i.e., the time delay between the current time slot T and the prior time slot T−1). Furthermore, τ is a prespecified characteristic decay time of the histogram (i.e., a characteristic time delay assigned to the histogram). For instance, τ can be specified as one month (i.e., thirty days) in the units by which ΔT is measured. If ΔT is measured in minutes, for example, and if τ is specified as thirty days, then the value of τ is 30*1,440, since there are 1,440 minutes in a day. Specifying τ at a value of one month means that a property value computed a month ago is effectively weighted $e^{-1}$~37% within the histogram compared to a property value computed for the current time slot. A property value computed three months ago is effectively weighted $e^{-3}$~5% within the histogram compared to a property value computed for the current time slot.

Updating the time-decaying histogram of property values for a property by the property value computed for the property in the current time slot using the equation H(T)=$w_{td}$H(T−1)+y(T) provides for memory and processing efficiency in maintaining the histogram. Specifically, updating the time-decaying histogram for a property is based on the histogram as most recently updated, H(T−1), and the property value computed for the property in the current time slot within a sparse vector, y(T). Once the histogram has been updated, the property value computed for the property does not have to be stored further, and can be discarded.

This provides for reduced memory requirements in maintaining the histogram, such as in scenarios in which a processing device is maintaining multiple histograms for each of hundreds, thousands, or more systems (e.g., servers), over long periods of time. For example, if histograms are maintained for ten properties for each of 1,000 systems, then 10,000 histograms are maintained. If the period of time is two years, or 730 days, at five-minute time slots, over 200,000 property values will have been computed for each histogram, or more than two billion property values overall. Updating the histogram in the manner described means that just 10,000 histograms have to be stored, and not the more than two billion property values, rendering this technique technologically efficient in a storage sense.

Furthermore, updating the time-decaying histogram of property values in this manner is computationally efficient because the entire histogram does not have to be constructed at each time slot. Rather, just the count corresponding to the most recently computed property value has to be incremented. In the example of the preceding paragraph, this means that just ~10,000 vector addition operations have to be performed, instead of reconstructing more than 10,000 histograms from over two billion property values, a process which becomes computationally intractable over time. Therefore, the aforementioned histogram-updating technique ensures that maintaining histograms is even technologically possible.

In one implementation, rather than maintaining one histogram for each different property, $N_S$ histograms are maintained for each property, where $N_S$ specifies the number of seasons. The number of seasons corresponds to the periodic load and behavior changes of the system generating the events, so that anomalies are detected on a seasonal basis, taking into account just the property values computed in the same season. The number of seasons is thus specified in consideration of how a system changes periodically in load and behavior.

More specifically, a seasonality scheme can be defined by a period, such as $P_S$=7 days, and a season length such as $L_S$=6 hours, or 0.25 days. Each season thus corresponds to a six-hour interval within a generic week. The number of seasons $N_S$ is equal to $$\frac{P_S}{L_S},$$

where $P_S$ and $L_S$ are selected so that $N_S$ is an integer.

Each time slot T is associated with a continuous season index $$C_T = \frac{(T \bmod P_S)}{L_S},$$

where mod is the modulo function, and $0 \le C_T < N_S$. Each continuous season index is mapped to an integer season index $I_T$=floor($C_T$); that is, each time slot is associated with one of the $N_S$ seasons, where floor is the mathematical floor function. Therefore, when a current time slot T is being analyzed for a given property, its integer season index $I_T$ is computed to determine which of the $N_S$ histograms for the property to update using the property value computed for the property in the current time slot T.

As such, a continuous season index can be employed to maintain multiple, season-specific histograms for each property, be it an event property or a global property. The example technique described above for utilizing such a continuous season index may exhibit discontinuity at each boundary between adjacent seasons. Linear interpolation of property values across consecutive seasons may be performed to avoid this issue.

Referring back to FIG. 1, upon the time-decaying histogram of property values for each different property being updated, an anomaly score is computed for each property value of each property (110). The histogram H(T) for a property has for each property value $X_k$ an associated count $w_k$. The count can also be referred to as an occurrence weight, insofar as the count has been time-decayed. The histogram for a property can thus also be expressed as $H(X_k, w_k)$. In one implementation, a sorted dictionary structure is used to store the histogram of each property, sorted by the property values, or dictionary keys, $X_k$.

For each property, an anomaly score is thus computed for each property value based on the occurrence weight of the property value. This means that if a property has fifteen different property values in its histogram, say, then fifteen anomaly scores are computed corresponding to the fifteen different property values. An anomaly score reflects the likelihood that its corresponding property value is indicative of an anomaly having occurred within the underlying system (e.g., server) with respect to the property in question. A higher anomaly score is more indicative of an anomaly having occurred than a lower score.

In one implementation, for each property value x of a property, the anomaly score is derived from a distinct residual property function, $R_S(X)$, which is the probability to encounter property values $X_k$ within the histogram that are above x or close to x from below x within a separation scale parameter s. Stated another way, the anomaly score of a property value x of a property is computed using a distinct residual property function that can fully weight property values of the property within the histogram above x, and that can weight the property values of the property within the histogram below x by a dynamic weight that decreases with increasing distance from x in relation to a separation scale parameter s. In this way, the anomaly score of a property value x can be derived in consideration of the histogram of the property in question—i.e., in consideration of each property value $X_k$ (and its occurrence weight $w_k$), and not just in consideration of the property value x and the count of this property value.

In one implementation, the distinct residual property function can be denoted as $$R_S(x) = \frac{\Sigma_k G_S(X_k - x) \cdot w_k}{\Sigma_k w_k}.$$

The function $G_S(\Delta x)$ is a gradual step function that has the following properties. First, $G_s(\Delta x \geq 0) = 1$, which means that property values within the histogram above x are fully considered with a weight of 100%. Second, $G_s(-\Delta x = s) \sim 0.5$, which means that property values within the histogram below x by the separation scale parameter s are partially considered with a weight of 50%. Third, $G_s(-\Delta x \gg s) \to 0$, which means that property values within the histogram below x by much more than the separation scale parameter s are effectively ignored with a weight of approaching 0%. Fourth, $G_s(\Delta x)$ should be continuous so that the computed anomaly score does not become a discontinuous function of x that is sensitive to very small changes in x.

One example of a gradual step function that can serve as the basis of the distinct residual property function that has been described is a one-sided exponential function. The one-sided exponential function can be denoted as if $\Delta x < 0$ then $$G_S(\Delta x) = 2^{\left(\frac{\Delta x}{s}\right)},$$

and otherwise (i.e., else) $G_s(\Delta x) = 1$. Therefore, when a property value is below x by the separation scale parameter s, the gradual step function is 0.5, and as a property value increases its distance below x by more than the separation scale parameter s, the graduation step function exponentially decreases towards zero.

The separation scale parameter s can be a global parameter that controls the smooth of noise within anomalies occurring with a property value. That is, the separation scale parameter s is selected so that insignificant anomalies are mathematically pushed towards zero. A property specified in a logarithmic domain, such as the example properties that have been described, may have a separation scale parameter of one or 1.6, for example.

The anomaly score of a property value x is computed from the distinct residual property function. In one implementation, $$A_S = \log_2 \left\{ \frac{1}{R_S(x)} - 1 \right\}_{0+}.$$

As such, values of $R_s(x) \geq 0.5$ corresponding to relatively low values are mapped towards zero, and values close to zero (i.e., $R_s(x) \ll 0.5$) closely approximate $-\log_2 R_s(x)$.

The result of part 110 is therefore, for each different property value of each different property (including both event properties and global properties), an anomaly score is computed. For example, if there are properties P1 and P2, where P1 has three different property values p1a, p1b, and p1c for which there are counts or occurrence weights within the histogram for P1, and P2 has four different property values p2a, p2a, p2b, p2c, and p2d for which there are counts or occurrence weights within the histogram for P2, then a total of seven anomaly scores are computed. That is, an anomaly score is computed for each of p1a, p1b, p1c, p2a, p2b, p2c, and p2d.

It is noted that if the time-decaying histogram for a property is season-specific, such that there are multiple season-specific histograms for the property, then the anomaly score is computed for each property value of this property with respect to the current season-specific histogram. That is, just a current season-specific histogram is updated in part 108 using the property value computed in part 106. The current season-specific histogram is the season-specific histogram identified by the integer season index of the current time slot. When computing the anomaly score, the property values of just the current season-specific histogram (and their corresponding occurrence weights) are considered.

The processing device performing the method 100 repeats the method 100 at part 102 when event-time pairs are received for the next time slot, which becomes the current time slot. As such, on a time slot-by-time slot basis, the processing device receives event-time pairs, computes property values for each different event and/or global property from the received event-time pairs, updates time-decaying histograms for the properties using the computed property values, and computes anomaly scores for the different property values. The anomaly scores indicate the likelihood of anomalies having occurred within the system at which the events of the event-time pairs have occurred (and from which the event-time pairs have been received). The anomaly scores can thus be used to detect the occurrence of anomalies within the system.

FIG. 4 shows an example method 400 as to how the computed anomaly score can be used to detect an anomaly as a trigger on which basis to perform a remedial action. The processing device that computes the anomaly score can also perform the method 400, or another computing device may perform the method 400. The device performing the method 400 detects that an anomaly has occurred, from the anomaly scores that have been computed (402). For instance, the anomaly scores may be ranked from highest score to lowest score. If any anomaly score is greater than a threshold, then it may be concluded that an anomaly has occurred at the system generating the events in relation to which the anomaly score has been computed. As another example, if more than a certain number of events are each greater than a threshold, then it may be concluded that an anomaly has occurred. These two implementations can be combined, where if any event is greater than a higher threshold, or if more than a certain number of events are each greater than a lower threshold, then an anomaly is said to have been detected.

It is noted in this respect that a characteristic of the anomaly scores computed in accordance with the techniques that have been described is that the anomaly scores are unitless and have the same scale. This means that anomaly scores pertaining to properties related to different types of events are directly comparable with one another. This characteristic permits anomalies to be detected that reveal themselves over a confluence of different event types and that are not otherwise easily (or even) detectable in consideration of events of just one event type.

In response to detecting the anomaly the device performs a remedial action related to the system at which the anomaly has been detected (404). The system may be a computing device like a server, for instance. The remedial action can include a physical action performed on the system. For example, a server may be rebooted, or powered off and the on. Thus, the remedial action is performed responsive to detecting an anomaly from anomaly scores that are computed from property values of time-decaying histograms that are updated from computed property values from received event-time pairs.

FIG. 5 shows an example system 500. The system 500 includes a computing device 502 and a target system 504 that can be communicatively interconnected over a network 506. The target system 504 can be a computing device like a server, and can log messages that result in event-time pairs being reported to computing device 502 concerning events that have occurred at the target system 504. The events may be related to physical parameters such as temperature, humidity, gaseous pressure, fluidic flow rate, and so on. The events may be related to computing-oriented parameters such as instantaneous processor utilization, data storage rate, and so on.

The computing device 502 may also be a server or other type of computer. The computing device 502 includes communication hardware 510 by which the device 502 can communicatively connect to the network 502 to receive event-time pairs regarding events occurring at the target system 504. For example, the communication hardware 510 may be a network adapter to connect the computing device 502 to a network 506 that can be or include a local-area network (LAN), a wide-area network (WAN), an intranet, an extranet, the Internet, a mobile telephony network, and so on.

The computing device 502 includes a processor 512 and a non-transitory computer-readable data storage medium 514 that stores computer-executable code 516. The processor 512 executes the code 516 from the medium 514 to perform the methods that have been described. Thus, the computing device 502 successively computes anomaly scores as event-time pairs are received over time slots.

The techniques that have been described permit the computation of anomaly scores from time-decaying histograms for properties that are updated from property values computed for a current time slot. The anomaly scores are unitless and have the same scale. As such, anomaly scores corresponding to different properties are comparable and composable. Anomaly scores corresponding to different properties can therefore even be combined to yield other types of aggregated anomaly scores. The anomaly scores therefore permit anomalies within systems like servers to be more readily detected, so that remedial actions can be responsively performed to ensure the continuing proper operation of such systems.

We claim:

1. A non-transitory computer-readable data storage medium storing instructions executable by a processor to:
receive, for a current time slot of a plurality of time slots, a plurality of event-time pairs, each event-time pair denoting an occurrence of an event at a system by an event type of a plurality of different event types and an occurrence time;
for each different event type, compute for the current time slot a property value for each different property of a plurality of different properties from the event-time pairs having the different event type;
for each different property, update a time-decaying histogram of identified property values of the different property using the property value computed for the different property for the current time slot; and
for each identified property value within the time-decaying histogram of each different property, compute an anomaly score to detect occurrence of an anomaly within the system.

2. The non-transitory computer-readable data storage medium of claim 1, wherein the instructions are executable by the processor to further:
detect the anomaly within the system from the anomaly scores computed for the identified property values within the time-decaying histograms of the different properties;
responsive to detection of the anomaly, perform a remedial action at the system.

3. The non-transitory computer-readable data storage medium of claim 1, wherein the instructions are executable by the processor to, for each different event type, compute for the current time slot the property value for each different property by:
computing an activity property, an anomaly of which corresponds to a frequency of occurrences of the event of the different event type within the current time slot greater than a dynamic threshold corresponding to the occurrence frequency within previous time slots.

4. The non-transitory computer-readable data storage medium of claim 1, wherein the instructions are executable by the processor to, for each different event type, compute for the current time slot the property value for each different property by:
computing a surprise property, an anomaly of which corresponds to the occurrence of the event of the different event type within the current time slot after a length of time, in which the event has not occurred, that is greater than a dynamic threshold.

5. The non-transitory computer-readable data storage medium of claim 1, wherein the instructions are executable by the processor to, for each different event type, compute for the current time slot the property value for each different property by:

computing a burst property, an anomaly of which corresponds to multiple occurrences of the event of the different event type within the current time slot at time intervals less than a dynamic threshold.

6. The non-transitory computer-readable data storage medium of claim 1, wherein the instructions are executable by the processor to further:
for each different global property of a plurality of different global properties, compute for the current time slot a global property value from the event-time pairs having any different event type.

7. The non-transitory computer-readable data storage medium of claim 6, wherein the instructions are executable by the processor to, for each different global property, compute for the current time slot the global property value by:
computing a global activity property, an anomaly of which corresponds to event activity within the current time slot greater than a dynamic threshold.

8. The non-transitory computer-readable data storage medium of claim 6, wherein the instructions are executable by the processor to, for each different global property, compute for the current time slot the global property value by:
computing a global surprise property, an anomaly of which corresponds to the occurrences of the events of multiple different event types within the current time slot after a length of time in which the events have not occurred greater than a dynamic threshold.

9. The non-transitory computer-readable data storage medium of claim 6, wherein the instructions are executable by the processor to, for each different global property, compute for the current time slot the global property value by:
computing a global variety property, an anomaly of which corresponds to a number of the different event types of which there are occurrences of the events within the current time slot greater than a dynamic threshold.

10. The non-transitory computer-readable data storage medium of claim 6, wherein the instructions are executable by the processor to, for each different global property, compute for the current time slot the global property value by:
computing a global frequent event variety property, an anomaly of which corresponds to a number of the different event types of which there are occurrences of the event within the current time slot, such that the number is greater than a first dynamic threshold and the occurrences are greater than a second dynamic threshold.

11. The non-transitory computer-readable data storage medium of claim 6, wherein the instructions are executable by the processor to, for each different global property, compute for the current time slot the global property value by:
computing a global event dynamics property, an anomaly of which corresponds to successive occurrences of events of different event types within the current time slot at time intervals less than a dynamic threshold.

12. The non-transitory computer-readable data storage medium of claim 1, wherein the instructions are executable by the processor to, for each different property, update the time-decaying histogram of the identified property values of the different property by:
multiplying each of a plurality of counts of the time-decaying histogram over which identified property values are distributed by a time decay factor based on a time interval between the current time slot and a prior time slot and based on a characteristic time delay assigned to the time-decaying histogram; and
adding to each count of the time-decaying histogram a number of the property values computed for the different property for the current time slot that are associated with the count.

13. The non-transitory computer-readable data storage medium of claim 1, wherein each time slot is associated with a continuous season index,
wherein the instructions are executable by the processor to, for each different property, update the time-decaying histogram of the identified property values of the different property by:
updating a current season-specific time-decaying histogram of a plurality of season-specific time-decaying histograms using the identified property value of the different property, each season-specific time-decaying histogram associated with a different season in correspondence with the continuous season index,
and wherein the instructions are executable by the processor to, for each identified property value within the time-decaying histogram of each different property, compute the anomaly score by:
for each identified property value within the current season-specific time-decaying histogram of each different property, computing a current season-specific anomaly score.

14. The non-transitory computer-readable data storage medium of claim 1, wherein the instructions are executable by the processor to, for each identified property value within the time-decaying histogram of each different property, compute the anomaly score by:
computing the anomaly score using a distinct residual probability function fully weighting property values of the different property above the identified property value and weighting the property values of the different property below the identified property value by a dynamic weight decreasing with increasing distance from the identified property value in relation to a separation scale parameter.

15. The non-transitory computer-readable data storage medium of claim 14, wherein the distinct residual probability function is based on a one-sided exponential function in which the dynamic weight is specified as two to a power of a distance from the identified property value divided by the separation scale parameter.

16. The non-transitory computer-readable data storage medium of claim 14, wherein the separation scale parameter controls smoothing of noise within anomalies occurring for the identified property value within the time-decaying histogram of the different property.

17. A computer-implemented method performed by a computing device, the method comprising:
calculating for a current time slot a property value for a property of a system from a plurality of events occurring within the system during the current time slot;
time-decaying a plurality of counts of a histogram for the property, the counts corresponding to seen property values for the property of the system in time slots prior to the current time slot;
incrementing a selected count of the histogram corresponding to the calculated property value for the property; and for each seen property value, computing an anomaly score from the count of the histogram corresponding to the property value to detect occurrence of an anomaly within the system.

18. The computer-implemented method of claim 17, wherein, for each seen property value, computing the anomaly score comprises:

computing the anomaly score as a distinct residual probability function fully weighting property values above the seen property value and weighting the property values below the seen property value by a dynamic weight decreasing with increasing distance from the seen property value in relation to a separation scale parameter.

19. The computer-implemented method of claim 18, wherein the separation scale parameter controls smoothing of noise within anomalies occurring for the seen property value within the histogram.

20. A system comprising:

communication hardware to receive events from a target system that occurred at the target system within a time slot;

a processor; and a non-transitory computer-readable data storage medium to store computer-executable code that the processor is to execute to compute an anomaly score from a time-decaying histogram updated from the received events to detect occurrence of an anomaly within the system.

\* \* \* \* \*